United States Patent
Yokoyama et al.

(10) Patent No.: US 10,709,138 B2
(45) Date of Patent: Jul. 14, 2020

(54) HERBICIDAL AGRICHEMICAL COMPOSITION AND HERBICIDAL METHOD USING SAME

(71) Applicant: KUMIAI CHEMICAL INDUSTRY CO., LTD., Taitoh-ku (JP)

(72) Inventors: Mori Yokoyama, Taitoh-ku (JP); Ken Ueda, Taitoh-ku (JP)

(73) Assignee: KUMIAI CHEMICAL INDUSTRY CO., LTD., Taitoh-ku (JP)

( * ) Notice: Subject to any disclaimer, the term of this patent is extended or adjusted under 35 U.S.C. 154(b) by 110 days.

(21) Appl. No.: 16/084,862

(22) PCT Filed: Apr. 18, 2017

(86) PCT No.: PCT/JP2017/015628
§ 371 (c)(1),
(2) Date: Sep. 13, 2018

(87) PCT Pub. No.: WO2017/188070
PCT Pub. Date: Nov. 2, 2017

(65) Prior Publication Data
US 2019/0053496 A1 Feb. 21, 2019

(30) Foreign Application Priority Data
Apr. 28, 2016 (JP) .................. 2016-091405

(51) Int. Cl.
| | |
|---|---|
| *A01N 43/60* | (2006.01) |
| *A01N 43/30* | (2006.01) |
| *A01N 43/56* | (2006.01) |
| *A01N 43/90* | (2006.01) |
| *A01N 43/54* | (2006.01) |
| *A01N 43/80* | (2006.01) |
| *A01N 41/10* | (2006.01) |
| *A01N 59/26* | (2006.01) |
| *A01N 47/06* | (2006.01) |
| *A01M 21/04* | (2006.01) |
| *A01N 43/08* | (2006.01) |
| *A01N 25/12* | (2006.01) |
| *A01N 43/40* | (2006.01) |
| *A01N 25/04* | (2006.01) |
| *A01N 25/00* | (2006.01) |

(52) U.S. Cl.
CPC ............ *A01N 59/26* (2013.01); *A01M 21/04* (2013.01); *A01M 21/043* (2013.01); *A01N 25/00* (2013.01); *A01N 25/04* (2013.01); *A01N 25/12* (2013.01); *A01N 41/10* (2013.01); *A01N 43/08* (2013.01); *A01N 43/40* (2013.01); *A01N 43/54* (2013.01); *A01N 43/56* (2013.01); *A01N 43/60* (2013.01); *A01N 43/80* (2013.01); *A01N 43/90* (2013.01); *A01N 47/06* (2013.01)

(58) Field of Classification Search
None
See application file for complete search history.

(56) References Cited

U.S. PATENT DOCUMENTS

| | | |
|---|---|---|
| 2004/0082481 A1 | 4/2004 | Griffiths et al. |
| 2005/0202972 A1 | 9/2005 | Piper et al. |
| 2007/0021305 A1 | 1/2007 | Baker |
| 2015/0051076 A1 | 2/2015 | Schnabel et al. |
| 2015/0250165 A1 | 9/2015 | Balastre et al. |

FOREIGN PATENT DOCUMENTS

| | | | |
|---|---|---|---|
| CN | 103314963 | A | 9/2013 |
| CN | 103348981 | A | 10/2013 |
| JP | 10-109904 | A | 4/1998 |
| JP | 2004-522760 | A | 7/2004 |
| JP | 2005-515234 | A | 5/2005 |
| JP | 2009-79000 | A | 4/2009 |
| JP | 2009-114102 | A | 5/2009 |
| JP | 2013-180982 | A | 9/2013 |
| JP | 2015-510912 | A | 4/2015 |
| WO | WO 02/063956 | A1 | 8/2002 |
| WO | WO 03/105588 | A1 | 12/2003 |
| WO | WO 2006/003371 | A2 | 1/2006 |
| WO | WO 2007/011847 | A2 | 1/2007 |
| WO | WO 2008/135854 | A2 | 11/2008 |

OTHER PUBLICATIONS

International Search Report dated Aug. 1, 2017, in PCT/JP2017/015628 filed Apr. 18, 2017.
The partial Supplementary European Search Report dated Nov. 27, 2019 in European Patent Application No. 17789355.9, 15 pages.

*Primary Examiner* — Alton N Pryor
(74) *Attorney, Agent, or Firm* — Oblon, McClelland, Maier & Neustadt, L.L.P.

(57) ABSTRACT

To provide a herbicidal agrichemical composition having a HPPD inhibitory action and a herbicidal method using the same.
A herbicidal agrichemical composition comprising: a herbicidal active ingredient having a 4-hydroxyphenylpyruvate dioxygenase (HPPD) inhibitory action; and an inorganic phosphorus compound comprising a phosphorus oxoacid or an agriculturally acceptable salt thereof.

20 Claims, No Drawings

HERBICIDAL AGRICHEMICAL COMPOSITION AND HERBICIDAL METHOD USING SAME

TECHNICAL FIELD

The present invention relates to a herbicidal agrichemical composition capable of stably developing immediate effectiveness, and a herbicidal method using the same.

BACKGROUND ART

A 4-hydroxyphenylpyruvate dioxygenase inhibitor (hereinafter, referred to as a "HPPD inhibitor") is known as a useful herbicide, but development in effects may be delayed depending on formulations or fields environment, and some of factors for the delay are still unclear.

Therefore, formulation techniques for immediately and stably developing a HPPD inhibitory effect, regardless of formulations or field conditions, are required.

In agricultural fields, inorganic phosphorus compounds are known to be used as fertilizers or physical-property modifiers for agricultural chemicals. For example, Patent Document 1 discloses a water-surface floatable granular agrichemical composition containing an agrichemical active ingredient, a specific alkanediol derivative, a condensed phosphoric acid or a salt thereof, a floating aid and a bulking filler, and it describes that the diffusivity of the water-surface floatable granular agrichemical composition is dependent on presence or absence of the salt of condensed phosphoric acid.

However, Patent Document 1 neither discloses nor suggests that the salt of condensed phosphoric acid is associated with development of a HPPD inhibitory effect, and further it neither discloses nor suggests that the salt of condensed phosphoric acid influences development of a HPPD inhibitory effect since it has no herbicidal activity with a usual dosage.

PRIOR ART DOCUMENT

Patent Document

Patent Document 1: JP-A-2009-114102

DISCLOSURE OF INVENTION

Technical Problem

The object of the present invention is to provide a herbicidal agrichemical composition having a HPPD inhibitory action, capable of stably developing immediate effectiveness, and a herbicidal method using the herbicidal agrichemical composition as a formulation.

Solution to Problem

The present inventors have conducted extensive studies to achieve the above object and as a result, have found that the above object can be achieved and accomplished the present invention.

That is, the present invention provides the following.

(1) A herbicidal agrichemical composition comprising: a herbicidal active ingredient having a 4-hydroxyphenylpyruvate dioxygenase (HPPD) inhibitory action; and an inorganic phosphorus compound comprising a phosphorus oxoacid or an agriculturally acceptable salt thereof.

(2) The herbicidal agrichemical composition according to (1), wherein the herbicidal active ingredient is at least one member selected from the group consisting of ketospiradox, mesotrione, sulcotrione, isoxachlortole, isoxaflutole, benzofenap, pyrazolynate, pyrazoxyfen, benzobicyclon, topramezone, pyrasulfotole, tefuryltrione, tembotrione, bicyclopyrone, fenquinotrione and tolpyralate.

(3) The herbicidal agrichemical composition according to (1), wherein the herbicidal active ingredient is fenquinotrione.

(4) The herbicidal agrichemical composition according to any one of (1) to (3), wherein the phosphorus oxoacid is phosphorous acid, phosphonic acid, orthophosphoric acid or condensed phosphoric acid containing from 2 to 12 phosphorus atoms.

(5) The herbicidal agrichemical composition according to any one of (1) to (3), wherein the phosphorus oxoacid is pyrophosphoric acid, tripolyphosphoric acid or metaphosphoric acid.

(6) The herbicidal agrichemical composition according to any one of (1) to (5), wherein the agriculturally acceptable salt of the phosphorus oxoacid is an alkali metal salt, an alkaline earth metal salt or an ammonium salt.

(7) The herbicidal agrichemical composition according to any one of (1) to (6), wherein the herbicidal active ingredient is contained in an amount of from 1 to 80 parts by mass, and the inorganic phosphorus compound is contained in an amount of from 0.1 to 10 parts by mass, per 100 parts by mass of the herbicidal agrichemical composition.

(8) The herbicidal agrichemical composition according to any one of (1) to (7), which is in a form of granules, a water-based suspension or an oil-based suspension.

(9) The herbicidal agrichemical composition according to (8), which has a water-surface floating property.

(10) The herbicidal agrichemical composition according to (9), which are particles each having a short diameter being at least 3 mm.

(11) The herbicidal agrichemical composition according to (8), which has no water-surface floating property.

(12) The herbicidal agrichemical composition according to any one of (1) to (11), which has a pH of from 8 to 13 at 20° C. when formed into a suspension by dispersing 10 parts by mass of a herbicidal agrichemical composition into 90 parts by mass of distilled water.

(13) A herbicidal method comprising spraying the herbicidal agrichemical composition as defined in any one of (1) to (11), on agricultural fields or non-agricultural fields.

Advantageous Effects of Invention

A herbicide having a HPPD inhibitory action by using the herbicidal agrichemical composition of the present invention can stably develop immediate effectiveness and has a high HPPD inhibitory effect even at a low dose, and thus is useful as a herbicidal agrichemical.

Description of Embodiments

The herbicidal agrichemical composition of the present invention (hereinafter, sometimes referred to simply as "composition") contains, as essential components, a herbicidal active ingredient having a HPPD inhibitory action and the above specific inorganic phosphorus compound.

The herbicidal active ingredient having a HPPD inhibitory action, which can be used in the present invention, may, for example, be ketospiradox, mesotrione, sulcotrione, isoxachlortole, isoxaflutole, benzofenap, pyrazolynate, pyrazoxyfen, benzobicyclon, topramezone, pyrasulfotole, tefuryltrione, tembotrione, bicyclopyrone, fenquinotrione or tolpyralate. Among them, mesotrione, sulcotrione, tefuryltrione or fenquinotrione is preferred, and fenquinotrione is more preferred. Such a herbicidal active ingredient may be used alone or two or more of them may be used in combination.

In the present invention, the content of the herbicidal active ingredient is preferably from 1 to 80 parts by mass, particularly preferably from 2 to 30 parts by mass, per 100 parts by mass of the herbicidal agrichemical composition.

The phosphorus oxoacid constituting the inorganic phosphorus compound contained in the herbicidal agrichemical composition of the present invention may, for example, be phosphorus acid, phosphonic acid, orthophosphoric acid or condensed phosphoric acid. The condensed phosphoric acid is a polyphosphoric acid containing from 2 to 12, preferably from 2 to 6 phosphorus atoms, which is obtainable by heating orthophosphoric acid. As a preferred example, pyrophosphoric acid, metaphosphoric acid (hexametaphosphoric acid), tripolyphosphoric acid, polyphosphoric acid or ultraphosphoric acid may be mentioned. Among them, tripolyphosphoric acid is preferred.

Further, the agriculturally acceptable salt of the phosphorus oxoacid may, for example, be an alkali metal salt (such as a sodium salt or a potassium salt), an alkaline earth metal salt (such as a calcium salt or a magnesium salt) or an ammonium salt. Among them, an alkali metal salt is preferred.

The content of the inorganic phosphorus compound in the herbicidal agrichemical composition of the present invention is preferably from 0.1 to 10 parts by mass, particularly preferably from 1 to 4 parts by mass, per 100 parts by mass of the herbicidal agrichemical composition. When the content of the inorganic phosphorus compound is within such a range, it is possible to stably and immediately achieve a high HPPD inhibitory effect even at a low dose, which is the effect of the present invention.

The herbicidal agrichemical composition of the present invention is formulated into various formulations such as wettable powders, dust formulations, water dispersible granules, water-based suspension formulations, oil-based suspension formulations, granules, jumbo formulations, suspoemulsions, or uniformly diffusible formulations having water-surface floating property. Preferred formulations may, for example, be dust formulations, granules, wettable powders, water dispersible granules, water-based suspension formulations or oil-based suspension formulations.

When the herbicidal agrichemical composition is in the form of granules, such granules may, for example, be spherical, columnar or irregular ones.

In the case of spherical granules, particle diameters thereof are usually from 0.3 to 10 mm, preferably from 0.3 to 3 mm. In the case of columnar granules, diameters thereof are usually from 0.6 to 8 mm, preferably from 0.8 to 5 mm, and lengths of the granules are usually from 1 to 10 mm, preferably from 1.5 to 8 mm. In the case of irregular granules, usually, the diameters thereof are not particularly limited so long as they are from 0.1 to 10 mm.

When the herbicidal agrichemical composition is in the form of granules, it may have a water-surface floating property. The herbicidal agrichemical composition having a water-surface floating property is not particularly limited, but may, for example, be one having a shape constructed by a curved surface, and having a weight per particle being from 0.03 to 0.3 g, a particle density being from 0.4 to 1.0, a short diameter of the particle being at least 3 mm and a ratio of the long diameter to the short diameter being from 1 to 3. The production method thereof and specific examples may, for example, be disclosed in JP-A-2000-302602.

When the herbicidal agrichemical composition is in the form of granules, the composition may contain e.g. a binder, a surfactant or a solid carrier, other than the herbicidal active ingredient and the inorganic phosphorus compound or a salt thereof.

A binder is used for increasing hardness of particles. The binder to be used is not particularly limited so long as it is usually used for a granular agrichemical composition. For example, starch, soluble starch, dextrin, α-modified starch, sodium alginate, gum Arabic, gelatin, a lignin sulfonate, carboxymethyl cellulose and a salt thereof, methylcellulose, hydroxyethyl cellulose, polyvinyl alcohol, polyvinyl methyl ether, polyacrylamide, sodium polyacrylate, hydroxypropyl cellulose, hydroxypropylmethyl cellulose, polyethylene glycol, polyethylene oxide, polyvinyl pyrrolidone, ethyl cellulose, acetyl cellulose, ester gum or hardened oil may be mentioned, but the binder is not particularly limited. As the binder, one type may be used alone or at least two types may be used as a mixture. Its blend proportion is not particularly limited, but is usually from 0.1 to 10 parts by mass, preferably from 1 to 5 parts by mass, per 100 parts by mass of the composition.

A surfactant is used as an adjustor for improving granulation property or elution of agrichemical active ingredient. The surfactant to be used is not particularly limited so long as it is usually used for a granular agrichemical composition. For example, polyoxyethylene alkyl phenyl ether, a sodium alkylbenzene sulfonate, dioctylsulfosuccinate, a sodium alkyl naphthalene sulfonate, a sodium alkyl sulfate or a sodium alkyl sulfosuccinate may be mentioned, but the surfactant is not particularly limited. Preferred is an anionic surfactant or a nonionic surfactant. As the surfactant, one type may be used alone or at least two types may be used as a mixture. Its blend proportion is not particularly limited, but is usually from 0.01 to 20 parts by mass, preferably from 0.1 to 10 parts by mass, per 100 parts by mass of the composition.

A solid carrier is used as an excipient at the time of adjusting the blend ratio of the herbicidal active ingredient in the composition and at the time of forming into granules. The solid carrier to be used is not particularly limited so long as it is usually used for an agrichemical composition. For example, a clay, talc, calcium carbonate, diatomaceous earth, zeolite, bentonite, attapulgite, acid clay or white carbon may be used. As the solid carrier, one type may be used alone or at least two types may be used as a mixture. Its blend proportion is not particularly limited, but is usually from 5 to 80 parts by mass, per 100 parts by mass of the composition.

In a case where the herbicidal agrichemical composition is in the form of granules, a production method thereof is not particularly limited, but is usually the following method. For example, all of raw materials are mixed by e.g. an extruder until all of the raw materials would be uniform, and thereafter water is added thereto, followed by kneading. Pressure is applied by e.g. a screw or a roller, followed by extruding the kneaded product from a plate having an opening with a specific size so as to obtain granules. The granules thus extruded is cut into a proper length by means of e.g. cutting, and dried at a temperature of from 50 to 100° C. to obtain columnar granules. Or a pan granulator is used to carry out granulation, followed by drying at a temperature of from 50 to 100° C. to obtain spherical granules. Or a fluidized bed granulator is used to carry out granulation at a temperature of from 50° C. to 100° C., followed by drying to obtain irregular granules.

When the herbicidal agrichemical composition is a water-based suspension formulation or an oil-based suspension formulation, the composition may contain a liquid carrier, a surfactant, a thickener, a colorant, an anti-freezing agent, a stabilizer, an anti-foaming agent or a preservative, other than the herbicidal active ingredient and the inorganic phosphorus compound or a salt thereof.

The liquid carrier is not particularly limited, but may, for example, be a monohydric alcohol such as methanol, ethanol, propanol, isopropanol or butanol; a polyhydric alcohol such as ethylene glycol, diethylene glycol, propylene glycol, hexylene glycol, polyethylene glycol, polypropylene glycol or glycerol; a polyhydric alcohol compound such as propylene glycol ether; a ketone such as acetone, methyl ethyl ketone, methyl isobutyl ketone, diisobutyl ketone or cyclohexanone; an ether such as ethyl ether, dioxane, ethylene glycol monoethyl ether, dipropyl ether or tetrahydrofuran; an aliphatic hydrocarbon such as normal paraffin, naphthene, isoparaffin, kerosine or mineral oil; an aromatic hydrocarbon such as benzene, toluene, xylene, solvent naphtha, alkyl benzene or alkyl naphthalene; a halogenated hydrocarbon such as dichloromethane, chloroform or carbon tetrachloride; an ester such as ethyl acetate, diisopropyl phthalate, dibutyl phthalate, dioctyl phthalate or dimethyl adipate; a lactone such as γ-butyrolactone; an amide such as dimethylformamide, diethylformamide, dimethylacetamide or N-alkylpyrrolidinone; a nitrile such as acetonitrile; a sulfur compound such as dimethylsulfoxide; a vegetable oil such as soybean oil, rapeseed oil, cotton oil or castor oil; or water. As the liquid carrier, one type may be used alone or at least two types may be used as a mixture. Its blend proportion is not particularly limited, but is usually from 5 to 95 parts by mass, per 100 parts by mass of the composition.

The surfactant is not particularly limited, but may, for example, be a non-ionic surfactant such as a sorbitan fatty acid ester, a polyoxyethylene sorbitan fatty acid ester, a sucrose fatty acid ester, a polyoxyethylene fatty acid ester, a polyoxyethylene resin acid ester, a polyoxyethylene fatty acid diester, a polyoxyethylene alkyl ether, a polyoxyethylene alkyl phenyl ether, a polyoxyethylene dialkyl phenyl ether, a polyoxyethylene alkyl phenyl ether formalin condensate, a polyoxyethylene polyoxypropylene block copolymer, an alkyl polyoxyethylene polypropylene block copolymer ether, a polyoxyethylene alkylamine, a polyoxyethylene fatty acid amide, a polyoxyethylene fatty acid bisphenyl ether, a polyalkylene benzyl phenyl ether, a polyoxyalkylene styryl phenyl ether, an acetylenediol, a polyoxyalkylene-added acetylenediol, a polyoxyethylene ether type silicone, an ester type silicone, a fluorinated surfactant, a polyoxyethylene castor oil or a polyoxyethylene hardened castor oil; an anionic surfactant such as an alkyl sulfate, a polyoxyethylene alkyl ether sulfate, a polyoxyethylene alkyl phenyl ether sulfate, a polyoxyethylene styryl phenyl ether sulfate, an alkylbenzene sulfonate, a lignin sulfonate, an alkylsulfosuccinate, a naphthalenesulfonate, an alkylnaphthalenesulfonate, a salt of a formalin condensate of naphthalenesulfonate, a salt of a formalin condensate of an alkylnaphthalenesulfonate, a fatty acid salt, a polycarboxylic acid salt, an N-methyl-fatty acid sarcosinate, a resin acid salt, a polyoxyethylene alkyl ether phosphate or a polyoxyethylene alkyl phenyl ether phosphate; a cationic surfactant such as a laurylamine hydrochloride, a stearylamine hydrochloride, an oleylamine hydrochloride, a stearylamine acetate, a stearylaminopropylamine acetate, an alkyltrimethylammonium chloride, or an alkyldimethylbenzalkonium chloride; or an amphoteric surfactant such as an amino acid type or a betain type. As the surfactant, one type may be used alone or at least two types may be used as a mixture. Its blend proportion is not particularly limited, but is usually from 0.1 to 30 parts by mass, preferably from 0.1 to 20 parts by mass, per 100 parts by mass of the composition.

The thickener is not particularly limited, but may, for example, be a water-soluble polymer such as xanthan gum, guar gum, carboxylmethylcellulose, polyvinylpyrrolidone, a carboxyvinyl polymer, an acrylic polymer, a starch derivative or polysaccharide; or an inorganic fine powder such as high purity bentonite or fumed silica (white carbon). As the thickener, one type may be used alone or at least two types may be used as a mixture. Its blend proportion is not particularly limited, but is usually from 0.1 to 20 parts by mass, preferably from 0.1 to 10 parts by mass, per 100 parts by mass of the composition.

The colorant is not particularly limited, but may, for example, be an inorganic pigment such as iron oxide, titanium oxide or Prussian blue; or an organic dye such as an arizarin dye, an azo dye or a metal phthalocyanine dye. As the colorant, one type may be used alone or at least two types may be used as a mixture. Its blend proportion is not particularly limited, but is usually from 0.1 to 20 parts by mass, preferably from 0.1 to 10 parts by mass, per 100 parts by mass of the composition.

The anti-freezing agent is not particularly limited, but may, for example, be a polyhydric alcohol such as ethylene glycol, diethylene glycol, propylene glycol or glycerol. As the anti-freezing agent, one type may be used alone or at least two types may be used as a mixture. Its blend proportion is not particularly limited, but is usually from 0.1 to 30 parts by mass, preferably from 1 to 20 parts by mass, per 100 parts by mass of the herbicidal agrichemical composition.

The stabilizer is not particularly limited, but may, for example, be a drying agent such as zeolite, quick lime or magnesium oxide; an anti-oxidation agent such as a phenol compound, an amine compound, a sulfur compound or a phosphoric acid compound; or an ultraviolet absorber such as a salicylic acid compound or a benzophenone compound. As the stabilizer, one type may be used alone or at least two types may be used as a mixture. Its blend proportion is not particularly limited, but is usually from 0.1 to 20 parts by mass, preferably from 0.1 to 10 parts by mass, per 100 parts by mass of the composition.

The anti-foaming agent is not particularly limited, but may, for example, be dimethylpolysiloxane, modified silicone, polyether, fatty ester or fatty acid salt. As the anti-foaming agent, one type may be used alone or at least two types may be used as a mixture. Its blend proportion is not particularly limited, but is usually from 0.1 to 10 parts by mass, preferably from 0.1 to 5 parts by mass, per 100 parts by mass of the composition.

The preservative is not particularly limited, but may, for example, be sodium benzoate, sodium parahydroxy benzoate, potassium sorbate or 1,2-benzothiazolin-3-one. As the preservative, one type may be used alone or at least two types may be used as a mixture. Its blend proportion is not particularly limited, but is usually from 0.1 to 10 parts by mass, preferably from 0.1 to 5 parts by mass, per 100 parts by mass of the composition.

In a case where the herbicidal agrichemical composition is a water-based suspension formulation or an oil-based suspension formulation, the production method is not particularly limited, but is usually a method of mixing a herbicidal active ingredient, an inorganic phosphorus compound or a salt thereof and other starting materials, with water or a suitable solvent, by e.g. a dissolver, and as the case requires, subjecting the mixture to wet grinding by using e.g. a bead mill so that the mixture is uniformly suspended.

The herbicidal agrichemical composition of the present invention may further contain a secondary agrichemical active ingredient. The secondary agrichemical active ingredient may, for example, be other herbicidal active ingredients, an insecticidal ingredient, a fungicidal ingredient, a plant growth modulating ingredient as described below, but the present invention is not limited thereto.

Herbicidal Active Ingredient:

Ioxynil, aclonifen, acrolein, azafenidin, acifluorfen (including e.g. sodium salt), azimsulfuron, asulam, acetochlor, atrazine, anilofos, amicarbazone, amidosulfuron, amitrole, aminocyclopyrachlor, aminopyralid, amiprofos-methyl, ametryn, alachlor, alloxydim, isouron, isoxachlortole, isoxaflutole, isoxaben, isoproturon, ipfencarbazone, imazaquin, imazapic (including e.g. amine salts), imazapyr (including e.g. isopropylamine salts), imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen-ethyl, ethofumesate, etobenzanid, endothal-disodium, oxadiazon, oxadiargyl, oxaziclomefone, oxasulfuron, oxyfluorfen, oryzalin, orthosulfamuron, orbencarb, oleic acid, cafenstrole, carfentrazone-ethyl, karbutilate, carbetamide, quizalofop-ethyl, quizalofop-P-ethyl, quizalofop-P-tefuryl, quinoclamine, quinclorac, quinmerac, cumyluron, clacyfos, glyphosate (including e.g. sodium, potassium, amine, propylamine, isopropylamine, dimethylamine and trimesium salts), glufosinate (including e.g. amine and sodium salts), glufosinate-P-sodium, clethodim, clodinafop-propargyl, clopyralid, clomazone, chlomethoxyfen, clomeprop, cloransulam-methyl, chloramben, chloridazon, chlorimuron-ethyl, chlorsulfuron, chlorthal-dimethyl, chlorthiamid, chlorphthalim, chlorflurenol-methyl, chlorpropham, chlorbromuron, chloroxuron, chlorotoluron, ketospiradox (including e.g. sodium, calcium and ammonium salts), saflufenacil, sarmentine, cyanazine, cyanamide, diuron, diethatyl-ethyl, dicamba (including e.g. amine, diethylamine, isopropylamine, diglycolamine, sodium and lithium salts), cycloate, cycloxydim, diclosulam, cyclosulfamuron, cyclopyrimorate, dichlobenil, diclofop-P-methyl, diclofop-methyl, dichlorprop, dichlorprop-P, diquat, dithiopyr, siduron, dinitramine, cinidon-ethyl, cinosulfuron, dinoseb, dinoterb, cyhalofop-butyl, diphenamid, difenzoquat, diflufenican, diflufenzopyr, simazine, dimethachlor, dimethametryn, dimethenamid, dimethenamid-P, simetryn, dimepiperate, dimefuron, cinmethylin, swep, sulcotrione, sulfentrazone, sulfosate, sulfosulfuron, sulfometuron-methyl, sethoxydim, terbacil, daimuron, thaxtomin A, dalapon, thiazopyr, tiafenacil, thiencarbazone (including e.g. sodium salt and methyl ester), tiocarbazil, thiobencarb, thidiazimin, thifensulfuron-methyl, desmedipham, desmetryne, thenylchlor, tebutam, tebuthiuron, tepraloxydim, tefuryltrione, tembotrione, terbuthylazine, terbutryn, terbumeton, topramezone, tralkoxydim, triaziflam, triasulfuron, triafamone, tri-allate, trietazine, triclopyr, triclopyr-butotyl, trifludimoxazin, tritosulfuron, triflusulfuron-methyl, trifluralin, trifloxysulfuron-sodium, tribenuron-methyl, tolpyralate, naptalam (including e.g. sodium salts), naproanilide, napropamide, napropamide-M, nicosulfuron, neburon, norflurazon, vernolate, paraquat, halauxifen-benzyl, halauxifen-methyl, haloxyfop, haloxyfop-P, haloxyfop-etotyl, halosafen, halosulfuron-methyl, picloram, picolinafen, bicyclopyrone, bispyribac-sodium, pinoxaden, bifenox, piperophos, pyraclonil, pyrasulfotole, pyrazoxyfen, pyrazosulfuron-ethyl, pyrazolynate, bilanafos, pyraflufen-ethyl, pyridafol, pyrithiobac-sodium, pyridate, pyriftalid, pyributicarb, pyribenzoxim, pyrimisulfan, pyriminobac-methyl, pyroxasulfone, pyroxsulam, phenisopham, fenuron, fenoxasulfone, fenoxaprop (including e.g. methyl, ethyl and isopropyl esters), fenoxaprop-P) (including e.g. methyl, ethyl and isopropyl esters), fenquinotrione, fenthiaprop-ethyl, fentrazamide, phenmedipham, foramsulfuron, butachlor, butafenacil, butamifos, butylate, butenachlor, butralin, butroxydim, flazasulfuron, flamprop (including e.g. methyl, ethyl and isopropyl esters), flamprop-M (including e.g. methyl, ethyl and isopropyl esters), primisulfuron-methyl, fluazifop-butyl, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl-sodium, flufenacet, flufenpyr-ethyl, flupropanate, flupoxame, flumioxazin, flumiclorac-pentyl, flumetsulam, fluridone, flurtamone, fluroxypyr, flurochloridone, pretilachlor, procarbazone-sodium, prodiamine, prosulfuron, prosulfocarb, propaquizafop, propachlor, propazine, propanil, propyzamide, propisochlor, propyrisulfuron, propham, profluazol, propoxycarbazone-sodium, profoxydim, bromacil, brompyrazon, prometryn, prometon, bromoxynil (including e.g. butyric acid, octanoic acid and heptanoic acid esters), bromofenoxim, bromobutide, florasulam, florpyrauxifen, florpyrauxifen-benzyl, hexazinone, pethoxamid, benazolin, penoxsulam, heptamaloxyloglucan, beflubutamid, pebulate, pelargonic acid, bencarbazone, pendimethalin, benzfendizone, bensulide, bensulfuron-methyl, benzobicyclon, benzofenap, bentazone, pentanochlor, pentoxazone, benfluralin, benfuresate, fosamine, fomesafen, foramsulfuron, mecoprop (including e.g. sodium, potassium, isopropylamine, triethanolamine and dimethylamine salts), mecoprop-P-potassium, mesosulfuron-methyl, mesotrione, metazachlor, metazosulfuron, methabenzthiazuron, metamitron, metamifop, disodium methanearsonate (DSMA), methiozolin, methyldymuron, metoxuron, metosulam, metsulfuron-methyl, metobromuron, metobenzuron, metolachlor, metribuzin, mefenacet, monosulfuron (including e.g. methyl, ethyl and isopropyl esters), monolinuron, molinate, iodosulfuron, iodosulfulon-methyl-sodium, iofensulfuron, iofensulfuron-sodium, lactofen, lancotrione, linuron, rimsulfuron, lenacil, 2,2,2-trichloroacetic acid (TCA) (including e.g. sodium, calcium and ammonium salts), 2,3,6-trichlorobenzoic acid (2,3,6-TBA), 2,4,5-trichlorophenoxyacetic acid (2,4,5-T), 2,4-dichlorophenoxyacetic acid (2,4-D) (including e.g. amine, diethylamine, triethanolamine, isopropylamine, sodium and lithium salts), 2-amino-3-chloro-1,4-naphthoquinone (ACN), 2-methyl-4-chlorophenoxyacetic acid (MCPA), 2-methyl-4-chlorophenoxybutyric acid (MCPB) (including e.g. sodium salt and ethyl ester), 4-(2,4-dichlorophenoxy)butyric acid (2,4-DB), 4,6-dinitro-O-cresol (DNOC) (including e.g. amine and sodium salts), AE-F-150944 (code number), IR-6396 (code number), MCPA-thioethyl, SYP-298 (code number), SYP-300 (code number), S-ethyldipropylthiocarbamate (EPTC), S-metolachlor.

Insecticidal Ingredient:

Acrinathrin, azadirachtin, azamethiphos, acynonapyr, azinphos-ethyl, azinphos-methyl, acequinocyl, acetamiprid, acetoprole, acephate, azocyclotin, abamectin, afidopyropen, afoxolaner, amidoflumet, amitraz, Alanycarb, aldicarb, aldoxycarb, allethrin [including d-cis-trans-isomer and d-trans-isomer], isazophos, isamidofos, isocarbophos, isoxathion, isofenphos-methyl, isoprocarb, ivermectin, imicyafos, imidacloprid, imiprothrin, indoxacarb, esfenvalerate, ethiofencarb, ethion, ethiprole, ethylene dibromide, etoxazole, etofenprox, ethoprophos, etrimfos, emamectin benzoate, endosulfan, empenthrin, oxamyl, oxydemetonmethyl, oxydeprofos, omethoate, cadusafos, kappa-tefluthrin, kappa-bifenthrin, karanjin, cartap, carbaryl, carbosulfan, carbofuran, gamma-BHC, xylylcarb, quinalphos, kinoprene, chinomethionat, coumaphos, cryolite, clothianidin, clofentezine, chromafenozide, chlorantraniliprole, chlorethoxyfos, chlordane, chloropicrin, chlorpyrifos, chlorpyrifos-methyl, chlorfenapyr, chlorfenvinphos, chlorfluazuron, chlormephos, chloroprallethrin, Cyanophos, diafenthiuron, diamidafos, cyantraniliprole, dienochlor, cyenopyrafen, dioxabenzofos, diofenolan, cyclaniliprole, dicrotophos, dichlofenthion, cycloprothrin, dichlorvos, dicloromezotiaz, 1,3-dichloropropene, dicofol, dicyclanil, disulfoton, dinotefuran, dinobuton, cyhalodiamide, cyhalothrin [including gamma isomer and lambda isomer], cyphenothrin [including (1R)-trans isomer], cyfluthrin [including beta-isomer], diflubenzuron, cyflumetofen, diflovidazin, cyhexatin, cypermethrin [including alpha isomer, beta isomer, theta-isomer and zeta isomer], dimethylvinphos, dimefluthrin, dimethoate, silafluofen, cyromazine, spinetoram, spinosad, spirodiclofen, spirotetramat, spiromesifen, Sulcofuron-sodium, sulfluramid, sulfoxaflor, sulfotep, diazinon, thiacloprid, thiamethoxam, tioxazafen, thiodicarb, thiocyclam, thiosultap, thionazin, thiofanox, thiometon, tetrachlorvinphos, tetradifon, tetraniliprole, tetramethylfluthrin, tetramethrin, tebupirimfos, tebufenozide, tebufenpyrad, tefluthrin, teflubenzuron, demeton-S-methyl, temephos, deltamethrin, terbufos, tralomethrin, transfluthrin, triazamate, triazophos, trichlorfon, triflumuron, triflumezopyrim, trimethacarb, tolfenpyrad, naled, nitenpyram, novaluron, noviflumuron, Verticillium lecanii, hydroprene, Pasteuriapenetrans, vamidothion, parathion, parathion-methyl, halfenprox, halofenozide, bioallethrin, bioallethrin s-cyclopentenyl, bioresmethrin, bistrifluron, hydramethylnon, bifenazate, bifenthrin, pyflubumide, piperonyl butoxide, pymetrozine, pyraclofos, pyrafluprole, pyridaphenthion, pyridaben, pyridalyl, pyrifluquinazon, pyriprole, pyriproxyfen, pirimicarb, pyrimidifen, pyriminostrobin, pirimiphos-methyl, pyrethrine, famphur, fipronil, fenazaquin, fenamiphos, fenitrothion, fenoxycarb, fenothiocarb, phenothrin [including (1R)-trans isomer], fenobucarb, fenthion, phenthoate, fenvalerate, fenpyroximate, fenbutatin oxide, fenpropathrin, fonofos, sulfuryl fluoride, butocarboxim, butoxycarboxim, buprofezin, furathiocarb, prallethrin, fluacrypyrim, fluazaindolizine, fluazuron, fluensulfone, sodium fluoroacetate, fluxametamide, flucycloxuron, flucythrinate, flusulfamide, fluvalinate [including tau-isomer], flupyradifurone, flupyrazofos, flufiprole, flufenerim, flufenoxystrobin, flufenoxuron, fluhexafon, flubendiamide, flumethrin, fluralaner, prothiofos, protrifenbute, flonicamid, propaphos, propargite, profenofos, broflanilide, profluthrin, propetamphos, propoxur, flometoquin, bromopropylate, hexythiazox, hexaflumuron, Paecilomyces tenuipes, Paecilomyces fumosoroceus, heptafluthrin, heptenophos, permethrin, benclothiaz, benzpyrimoxan, bensultap, benzoximate, bendiocarb, benfuracarb, Beauveria tenella, Beauveria bassiana, Beauveria brongniartii, phoxim, phosalone, fosthiazate, fosthietan, phosphamidon, phosmet, polynactins composite, formetanate, phorate, malathion, milbemectin, mecarbam, mesulfenfos, methomyl, metaflumizone, methamidophos, metham, methiocarb, methidathion, methyl isothiocyanate, methyl bromide, methoxychlor, methoxyfenozide, methothrin, metofluthrin, epsilon-metofluthrin, methoprene, metolcarb, mevinphos, meperfluthrin, Monacrosporium phymatophagum, monocrotophos, momfluorothrin, epsilon-momfluorothrin, litlure-A, litlure-B, aluminium phosphide, zinc phosphide, phosphine, lufenuron, rescalure, resmethrin, lepimectin, rotenone, fenbutatin oxide, calcium cyanide, nicotinesulfate, (Z)-11-tetradecenyl=acetate, (Z)-11-hexadecenal, (Z)-11-hexadecenyl=acetate, (Z)-9,12-tetradecadienyl=acetate, (Z)-9-tetradecen-1-ol, (Z,E)-9,11-tetradecadienyl=acetate, (Z,E)-9,12-tetradecadienyl=acetate, *Bacillus popilliae, Bacillus subtillis, Bacillus sphaericus, Bacillus thuringiensis* subsp. *Aizawai, Bacillus thuringiensis* subsp. *Israelensis, Bacillus thuringiensis* subsp. *Kurstaki, Bacillus thuringiensis* subsp. *Tenebrionis*, Bt protein (Cry1Ab, Cry1AC, Cry1fa, Cry2Ab, mCry3A, Cry3Ab, Cry3Bb, Cry34/35Ab1), CL900167 (code number), bis-(2-chloro-1-methylethyl) ether (DCIP), 1,1,1-trichloro-2,2-bis(4-chlorophenyl)ethane (DDT), dimethyl-2,2,2-trichloro-1-hydroxyethyl phosphonate (DEP), 4,6-dinitro-o-cresol (DNOC), O,O-diethyl-O-[4-dimethylsulfamoyl)phenyl]-phosphorothionate (DSP), O-ethyl-O-4-(nitrophenyl)phenylphosphonothioate (EPN), nuclear polyhedrosis virus embedded body, NA-85 (code number), RU15525 (code number), XMC, Z-13-icosen-10-one, ZXI8901 (code number), ME5382. Here, code number means a code name used in each company.

Fungicidal Ingredient:

Azaconazole, acibenzolar-S-methyl, azoxystrobin, anilazine, amisulbrom, ametoctradin, aldimorph, isotianil, isopyrazam, isofetamid, isoflucypram, isoprothiolane, ipconazole, ipfentrifluconazole, iprodione, iprovalicarb, iprobenfos, imazalil, iminoctadine-trialbesilate, iminoctadine-triacetate, imibenconazole, edifenphos, etaconazole, ethaboxam, ethirimol, ethoxyquin, etridiazole, enestroburin, enoxastrobin, epoxiconazole, organic oils, oxadixyl, oxazinylazole, oxathiapiprolin, oxycarboxin, oxine-copper, oxytetracycline, oxpoconazole-fumarate, oxolinic acid, copper dioctanoate, octhilinone, ofurace, orysastrobin, o-phenylphenol, kasugamycin, captafol, carpropamid, carbendazim, carboxin, carvone, quinoxyfen, quinofumeline, chinomethionat, captan, quinconazole, quintozene, guazatine, cufraneb, coumoxystrobin, kresoxim-methyl, clozylacon, chlozolinate, chlorothalonil, chloroneb, cyazofamid, diethofencarb, diclocymet, dichlofluanid, dichlobentiazox, diclomezine, dicloran, dichlorophen, dithianon, diniconazole, diniconazole-M, zineb, dinocap, dipymetitrone, diphenylamine, difenoconazole, cyflufenamid, diflumetorim, cyproconazole, cyprodinil, simeconazole, dimethirimol, dimethyl disulfide, dimethomorph, cymoxanil, dimoxystrobin, ziram, silthiofam, streptomycin, spiroxamine, sedaxane, zoxamide, dazomet, tiadinil, thiabendazole, thiram, thiophanate, thiophanate-methyl, thifluzamide, tecnazene, tecloftalam, tetraconazole, debacarb, tebuconazole, tebufloquin, terbinafine, dodine, dodemorph, triadimenol, triadimefon, triazoxide, trichlamide, triclopyricarb, tricyclazole, triticonazole, tridemorph, triflumizole, trifloxystrobin, triforine, tolylfluanid, tolclofos-methyl, tolnifanide, tolprocarb, nabam, natamycin, naftifine, nitrapyrin, nitrothal-isopropyl, nuarimol, copper nonyl phenol sulphonate, *Bacillus subtilis* (strain: QST 713), validamycin, valifenalate, picarbutrazox, bixafen, picoxystrobin, pydiflumetofen, bitertanol, binapacryl, biphenyl, piperalin, hymexazol, pyraoxystrobin, pyraclostrobin, pyraziflumid, pyrazophos, pyrametostrobin, pyriofenone, pyrisoxazole, pyrifenox, pyributicarb, pyribencarb, pyrimethanil, pyroquilon, vinclozolin, ferbam, famoxadone, phenazine oxide, fenamidone, fenaminstrobin, fenarimol, fenoxanil, ferimzone, fenpiclonil, fenpicoxamid, fenpyrazamine, fenbuconazole, fenfuram, fenpropidin, fenpropimorph, fenhexamid, folpet, phthalide, bupirimate, fuberidazole, blasticidin-S, furametpyr, furalaxyl, furancarboxylic acid, fluazinam, fluindapyr, fluoxastrobin, fluopicolide, fluopyram, fluoroimide, fluxapyroxad, fluquinconazole, furconazole, furconazole-cis, fludioxonil, flusilazole, flusulfamide, flutianil, flutolanil, flutriafol, flufenoxystrobin, flumetover, flumorph, proquinazid, prochloraz, procymidone, prothiocarb, prothioconazole, bronopol, propamocarb-hydrochloride, propiconazole, propineb, probenazole, bromuconazole, flometoquin, hexaconazole, benalaxyl, benalaxyl-M, benodanil, benomyl, pefurazoate, penconazole, pencycuron, benzovindiflupyr, benthiazole, benthiavalicarb-isopropyl, penthiopyrad, penflufen, boscalid, fosetyl (alminium, calcium, sodium), polyoxin, polycarbamate, Bordeaux mixture, mancozeb, mandipropamid, mandestrobin, maneb, myclobutanil, mineral oils, mildiomycin, methasulfocarb, metam, metalaxyl, metalaxyl-M, metiram, metconazole, metominostrobin, metrafenone, mepanipyrim, mefentrifluconazole, meptyldinocap, mepronil, iodocarb, laminarin, phosphorous acid and salts, copper oxychloride, silver, cuprous oxide, copper hydroxide, potassium bicarbonate, sodium bicarbonate, sulfur, oxyquinoline sulfate, copper sulfate, (3,4-d ichloroisothiazol-5-yl)methyl 4-(tert-butyl)benzoic acid ester (chemical name, CAS registered number:1231214-23-5), BAF-045 (code number), BAG-010 (code number), UK-2A (code number), dodecylbenzenesulfonic acid bisethylenediamine copper(II) salt (DBEDC), NF-180 (code number), triphenyltin acetate (TPTA), triphenyltin chloride (TPTC), triphenyltin hydroxide (TPTH), nonpathogenic Erwinia carotovora.

Plant Growth Modulating Ingredient:

1-naphthylacetamide, 1-methylcyclopropene, 2,6-diisopropylnaphthalene, 4-CPA (4-chlorophenoxyacetic acid), 4-oxo-4-(2-phenylethyl)aminobutyric acid (chemical name, CAS registered number: 1083-55-2), aviglycine, ancymidol, inabenfide, indole acetic acid, indole butyric acid, uniconazole, uniconazole-P, ethychlozate, ethephon, epocholeone, carvone, cloxyfonac, cloxyfonac-potassium, cloprop, chlormequat, cytokinins, cyclanilide, dikegulac, gibberellins, dimethipin, sintofen, daminozide, thidiazuron, n-decanol, triacontanol, trinexapac-ethyl, paclobutrazol, flumetralin, flurprimidol, flurenol, prohydrojasmon, prohexadione-calcium, benzylaminopurine, forchlorfenuron, maleic hydrazide, mepiquat chloride, mefluidide, calcium peroxide.

Further, the herbicidal agrichemical composition of the present invention may be blended with a safener if desired. Examples of the safener are described below, but the present invention is not limited thereto.

Safener Ingredient:

2,2-dichloro-N-(1,3-dioxan-2-ylmethyl)-N-(2-propenyl) acetamide (PPG-1292), 2-dichloromethyl-2-methyl-1,3-dioxane (MG-191), 3-dichloroacetyl-2,2,5-trimethyl-1,3-oxazolidine (R-29148), 4-dichloroacetyl-1-oxa-4-azaspiro [4.5]decane (AD-67), MON4660 (code number), metcamifen, N1,N2-diallyl-N2-dichloroacetylglycinamide (DKA-24), TI-35 (code number), isoxadifen, isoxadifen-ethyl, oxabetrinil, cloquintcet-mexyl, cyometrinil, dichlormid, dicyclonone, cyprosulfamide, 1,8-naphthalic anhydride, fenchlorazole-ethyl, fenclorim, furilazole, fluxofenim, flurazole, benoxacor, mefenpyr, mefenpyr-ethyl, mefenpyr-diethyl, lower alkyl substituted benzoic acid.

The herbicidal agrichemical composition of the present invention, adjusted as described above, is useful for e.g. a soil treatment agent or a foliar treatment agent in agricultural fields or non-agricultural fields, but is not limited to these agents. Further, water surface application in paddy fields is also included in the soil treatment and the foliar treatment. Further, the amount to be used is also not particularly limited, but is, for example, from 25 g to 10 kg, preferably from 100 g to 5 kg, more preferably from 250 g to 1 kg per 10 are.

As mentioned above, the herbicidal agrichemical composition of the present invention contains an inorganic phosphorus compound comprising a phosphorus oxoacid or an agriculturally acceptable salt thereof, whereby immediate effectiveness of the herbicidal activities having a HPPD inhibitory action stably increases, but such properties have not been known heretofore. As mentioned above, Patent Document 1 discloses that the diffusibility of the agrichemical granule composition having water-surface floating property increases in a case where a condensed phosphoric acid salt is contained in the agrichemical granule composition containing a specific alkanediol derivative represented by the following formula [III]:

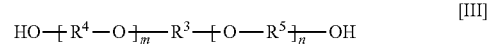

$$HO\!-\!\!\left[\!R^4\!-\!O\!\right]_{\!m}\!\!-\!R^3\!-\!\!\left[\!O\!-\!R^5\right]_{\!n}\!\!-\!OH \qquad [\text{III}]$$

(wherein $R^3$ is a $C_6$-$C_{14}$ saturated alkanediyl group; each of $R^4$ and $R^5$ is a $C_2$-$C_4$ alkylene group, and each of m and n is an integer, provided that the total of m and n is from 1 to 7, and when m is at least 2, each $R^4$ is the same or different, and when n is at least 2, each $R^5$ is the same or different), but Patent Document 1 neither discloses nor suggests that the herbicidal activity having a HPPD inhibitory action significantly increases, and such an effect cannot be foreseen even by a person skilled in the art.

EXAMPLES

Now, Examples will be described, but the present invention is by no means restricted thereto. Here, in the present invention, "part" represents parts by mass unless otherwise specified.

Example 1

To 3.0 parts of fenquinotrione, 1.0 part of enzyme-modified dextrin (Amycol No. 6L, manufactured by Nippon Starch Chemical Co., Ltd.,), 0.35 part of sodium alkylbenzene sulfonate (LIPON PS-860, manufactured by Lion Specialty Chemicals, Co., Ltd.), 4.0 parts of sodium tripolyphosphate (manufactured by KANTO CHEMICAL CO., INC.), and 91.65 parts of calcium carbonate (Tohoku Tancal #250, manufactured by Towa Lime Corporation), a proper amount of water was added, and a resulting mixture was kneaded by a kneader, and extruded from a plate having an opening with a pore diameter of 1 mm and having an effective thickness of 1.2 mm so as to obtain granules. The resulting granules were cut to have a length of at most 3.6 mm, and dried at 60° C. by a fluidized bed dryer. Thereafter, granules which passed through a sieve having openings of 1.7 mm and remained on a sieve having openings of 0.85 mm were collected so as to obtain a columnar herbicidal agrichemical composition. 10 parts by mass of the composition was dispersed in 90 parts by mass of distilled water to obtain a suspension which has pH of 9.4 at 20° C.

Example 2

To 3.0 parts of fenquinotrione, 1.0 part of enzyme-modified dextrin (Amycol No. 6L, manufactured by Nippon Starch Chemical Co., Ltd.), 0.35 part of sodium alkylbenzene sulfonate (LIPON PS-860, manufactured by Lion Specialty Chemicals, Co., Ltd.), 6.7 parts of tetrasodium pyrophosphate decahydrate (manufactured by KANTO CHEMICAL CO., INC.), and 88.95 parts of calcium carbonate (Tohoku Tancal #250, manufactured by Towa Lime Corporation), a proper amount of water was added, and a resulting mixture was kneaded by a kneader, and extruded from a plate having an opening with a pore diameter of 1 mm and having an effective thickness of 1.2 mm so as to obtain granules. The resulting granulates were cut to have a length of at most 3.6 mm, and dried at 60° C. by a fluidized bed dryer. Thereafter, the granules which passed through a sieve having openings of 1.7 mm and remained on a sieve having openings of 0.85 mm were collected so as to obtain a columnar herbicidal agrichemical composition. 10 parts by mass of the composition was dispersed in 90 parts by mass of distilled water to obtain a suspension which has pH of 10.2 at 20° C.

Example 3

To 3.0 parts of fenquinotrione, 1.0 part of enzyme-modified dextrin (Amycol No. 6L, manufactured by Nippon Starch Chemical Co., Ltd.,), 0.35 part of sodium alkylbenzene sulfonate (LIPON PS-860, manufactured by Lion Specialty Chemicals, Co., Ltd.), 4.0 parts of sodium hexametaphosphate (manufactured by KANTO CHEMICAL CO., INC.), and 91.65 parts of calcium carbonate (Tohoku Tancal #250, manufactured by Towa Lime Corporation), a proper amount of water was added, and a resulting mixture was kneaded by a kneader, and extruded from a plate having an opening with a pore diameter of 1 mm and having an effective thickness of 1.2 mm so as to obtain granules. The resulting granulates were cut to have a length of at most 3.6 mm, and dried at 60° C. by a fluidized bed dryer. Thereafter, granules which passed through a sieve having openings of 1.7 mm and remained on a sieve having openings of 0.85 mm, were collected so as to obtain a columnar herbicidal agrichemical composition. 10 parts by mass of the composition was dispersed in 90 parts by mass of distilled water to obtain a suspension which has pH of 8.8 at 20° C.

Example 4

To 12.0 parts of fenquinotrione, 3.0 parts of pyriminobac-methyl, 8.0 parts of pyraclonil, 4.0 parts of sodium tripolyphosphate (manufactured by KANTO CHEMICAL CO., INC.), 3.0 parts of sodium salt of a formalin condensate of naphthalenesulfonate, 5.0 parts of sodium naphthalenesulfonate, 2.0 parts of a mixture of polyoxyethylene styryl phenyl ether sulfate and polyoxyethylene alkyl ether (Sorpol 5284, manufactured by Toho Chemical Industry Co., Ltd.), 5.0 parts of sodium polyacrylate, 2.0 parts of dipolyoxyethylene ether, 2.0 parts of white carbon, 10.0 parts of microsphere, 2.0 parts of bentonite and 42.0 parts of calcium carbonate, a proper amount of water was added, and a resulting mixture was kneaded by a kneader, and extruded from a plate having an opening with a pore diameter of 5.0 mm and having an effective thickness of 10.0 mm so as to obtain granules. The resulting granulates were dried at 60° C. by a fluidized bed dryer so as to obtain a columnar herbicidal agrichemical composition having a short diameter of 5 mm. 10 parts by mass of the composition was dispersed in 90 parts by mass of distilled water to obtain a suspension which has pH of 8.7 at 20° C.

Comparative Example 1

To 3.0 parts of fenquinotrione, 3.0 parts of α-modified starch (Amycol K, manufactured by Nippon Starch Chemical Co., Ltd.,), 0.35 part of sodium alkylbenzene sulfonate (LIPON PS-860, manufactured by Lion Specialty Chemicals, Co., Ltd.) and 93.65 parts of calcium carbonate (Tohoku Tancal #250, manufactured by Towa Lime Corporation), a proper amount of water was added, a resulting mixture was kneaded by a kneader, and extruded from a plate having an opening with a pore diameter of 1 mm and having an effective thickness of 1.2 mm so as to obtain granules. The resulting granules were cut so as to have a length of at most 3.6 mm, and dried at 60° C. by using a fluidized bed dryer. Thereafter, granules which passed through a sieve having openings of 1.7 mm and remained on a sieve having openings of 0.85 mm, were collected so as to obtain a columnar herbicidal agrichemical composition. 10 parts by mass of the composition was dispersed in 90 parts by mass of distilled water to obtain a suspension which has pH of 9.4 at 20° C.

Comparative Example 2

To 1.0 part of enzyme-modified dextrin (Amycol No. 6L, manufactured by Nippon Starch Chemical Co., Ltd.,), 0.35 part of sodium alkylbenzene sulfonate (LIPON PS-860, manufactured by Lion Specialty Chemicals, Co., Ltd.), 4.0 parts of sodium tripolyphosphate (manufactured by KANTO CHEMICAL CO., INC.) and 94.65 parts of calcium carbonate (Tohoku Tancal #250, manufactured by Towa Lime Corporation), a proper amount of water was added, a resulting mixture was kneaded by a kneader, and extruded from a plate having an opening with a pore diameter of 1 mm and having an effective thickness of 1.2 mm so as to obtain granules. The resulting granules were cut so as to have a length of at most 3.6 mm, and dried at 60° C. by a fluidized bed dryer. Thereafter, granules which passed through a sieve having openings of 1.7 mm and remained on a sieve having openings of 0.85 mm, were collected so as to obtain a columnar herbicidal agrichemical composition. 10 parts by mass of the composition was dispersed in 90 parts by mass of distilled water to obtain a suspension which has pH of 9.4 at 20° C.

Test Example 1 (Medicinal Test to Lettuce and Scirpus Juncoides Roxb)

Absorbent cotton was placed on the bottom of a cylindrical plastic cup having an internal volume of 21 mL (milliliter), 8 mL of chemical solution was dropwise added thereto, and then lettuce and Scirpus juncoides Roxb were seeded thereto. The above chemical solution to be used was obtained in such a manner that 17.5 mg of a granular-shape herbicidal agrichemical composition obtained in each of Examples 1, 2 and 3 and Comparative Examples 1 and 2 was added to a plastic container (having a cuboid shape with a length of 26 cm, width of 38 cm and depth of 16 cm) having 6.3 L (liter) of three degree hard water, followed by treatment, and then sampled after 24 hours.

After the above seeding, the plants were grown in a growth chamber (light period: 16 hours, dark period: 8 hours, normal period: 24 hours), and on the seventh day after the treatment, the state of growth was visually observed so as to evaluate herbicidal effect index by comparing a control plot which was a test plot having no treatment with chemical solution.

Table 1 shows a relation between the index and the herbicidal effect, and Table 2 shows an evaluation result.

TABLE 1

| Index | Herbicidal effect |
|---|---|
| 0 | Equivalent to control plot to less than 10% of growth inhibitation |
| 1 | At least 10% and less than 20% of growth inhibitation |
| 2 | At least 20% and less than 30% of growth inhibitation |
| 3 | At least 30% and less than 40% of growth inhibitation |
| 4 | At least 40% and less than 50% of growth inhibitation |
| 5 | At least 50% and less than 60% of growth inhibitation |
| 6 | At least 60% and less than 70% of growth inhibitation |
| 7 | At least 70% and less than 80% of growth inhibitation |
| 8 | At least 80% and less than 90% of growth inhibitation |
| 9 | At least 90% and less than 100% of growth inhibitation |
| 10 | 100% of growth inhibitation (complete kill) |

TABLE 2

| | Herbicidal effect (%) On the seventh day after treatment | | Index On the seventh day after treatment | |
|---|---|---|---|---|
| Sample | Lettuce | Scirpus juncoides Roxb | Lettuce | Scirpus juncoides Roxb |
| Example 1 | 63 | 55 | 6 | 5 |
| Example 2 | 71 | 53 | 7 | 5 |
| Example 3 | 70 | 63 | 7 | 6 |
| Comparative Example 1 | 35 | 18 | 3 | 1 |
| Comparative Example 2 | 0 | 0 | 0 | 0 |

INDUSTRIAL APPLICABILITY

The herbicidal agrichemical composition of the present invention develops a high herbicidal effect even at a low dose and is useful as a HPPD inhibitor, and therefore it is useful in a wide range such as agricultural fields and non-agricultural fields.

The entire disclosure of Japanese Patent Application No. 2016-91405 filed on Apr. 28, 2016 including specification, claims, drawings and summary is incorporated herein by reference in its entirety.

The invention claimed is:

1. A herbicidal composition, comprising:
a herbicidal active ingredient comprising fenquinotrione and having a 4-hydroxyphenylpyruvate dioxygenase (HPPD) inhibitory action; and
an inorganic phosphorus compound comprising a phosphorus oxoacid or an agriculturally acceptable salt thereof,
wherein the composition, combining the herbicidal active ingredient and the inorganic phosphorus compound, has increased HPPD inhibitory herbicidal activity relative to a composition having only one of the herbicidal active ingredient or the inorganic phosphorus compound.

2. The composition of claim 1, wherein the herbicidal active ingredient further comprises tolpyralate, ketospiradox, isoxachlortole, isoxaflutole, pyrazolynate, pyrazoxyfen, topramezone, pyrasulfotole, tefuryltrione, tembotrione, and/or bicyclopyrone.

3. The composition of claim 1, wherein the herbicidal active ingredient is fenquinotrione.

4. The composition of claim 1, wherein the inorganic phosphorus compound comprises the phosphorus oxoacid, which comprises phosphorous acid, phosphonic acid, orthophosphoric acid, or condensed phosphoric acid comprising from 2 to 12 phosphorus atoms.

5. The composition of claim 1, wherein the inorganic phosphorus compound comprises the phosphorus oxoacid, which comprises pyrophosphoric acid, tripolyphosphoric acid, or metaphosphonic acid.

6. The composition of claim 1, wherein the inorganic phosphorus compound comprises the agriculturally acceptable salt of the phosphorus oxoacid, which is an alkali metal salt, an alkaline earth metal salt or an ammonium salt.

7. The composition of claim 1, comprising:
the herbicidal active ingredient in an amount of from 1 to 80 parts by mass, and
the inorganic phosphorus compound in an amount of from 0.1 to 10 parts by mass, per 100 parts by mass of the composition.

8. The composition of claim 1, which is in a form of granules, a water-based suspension, or an oil-based suspension.

9. The composition of claim 8, which has a water-surface floating property.

10. The composition of claim 9, which contains particles each having a diameter of at least 3 mm.

11. The composition of claim 8, which has no water-surface floating property.

12. The composition of claim 1, which has a pH of from 8 to 13 at 20° C. when formed into a suspension by dispersing 10 parts by mass of a pulverized product of the herbicidal composition into 90 parts by mass of distilled water.

13. A herbicidal method, comprising:
spraying the composition of claim 1 on one or more agricultural fields or non-agricultural fields.

14. The composition of claim 1, in granular form.

15. The composition of claim 1, comprising:
the herbicidal active ingredient in an amount of from 2 to 30 parts by mass per 100 parts by mass of the composition.

16. The composition of claim 1, wherein the fenquinotrione is present in a range of from 1 to 12 parts by mass, per 100 parts by mass of the composition.

17. The composition of claim 1, wherein the inorganic phosphorus compound comprises a polyphosphoric acid,
wherein the fenquinotrione is present in a range of from 1 to 12 parts by mass, per 100 parts by mass of the composition, and
wherein the polyphosphoric acid is present in a range of from 0.1 to 10 parts by mass, per 100 parts by mass of the composition.

18. The composition of claim 1, wherein the herbicidal active ingredient is fenquinotrione,
wherein the inorganic phosphorus compound comprises a polyphosphoric acid comprising from 2 to 6 phosphorus atoms,
wherein the fenquinotrione is present in a range of from 1 to 12 parts by mass, per 100 parts by mass of the composition, and
wherein the polyphosphoric acid is present in a range of from 1 to 4 parts by mass, per 100 parts by mass of the composition.

19. The composition of claim 18, further comprising a surfactant,
wherein the surfactant is present in a range of from 0.1 to 20 parts by mass, per 100 parts by mass of the composition.

20. The composition of claim 19, further comprising a thickener,
wherein the thickener is present in a range of from 0.1 to 10 parts by mass, per 100 parts by mass of the composition.

* * * * *